United States Patent
Shin (10) Patent No.: US 6,872,264 B2
(45) Date of Patent: Mar. 29, 2005

(54) ROAD WHEEL COMPOSITION AND METHOD FOR MANUFACTURING ROAD WHEEL USING THE SAME

(75) Inventor: Chirl Soo Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 10/327,436

(22) Filed: Dec. 20, 2002

(65) Prior Publication Data

US 2004/0041458 A1 Mar. 4, 2004

(30) Foreign Application Priority Data

Aug. 31, 2002 (KR) ................................. 10-2002-052325

(51) Int. Cl.$^7$ .......................... C22C 38/26; C22C 38/28; C21D 9/00; C21D 9/34
(52) U.S. Cl. ....................... 148/320; 148/330; 148/333; 148/583; 148/569; 148/644
(58) Field of Search ............................. 148/320, 333, 148/330, 583, 569, 644, 641, 639; 420/121, 104

(56) References Cited

U.S. PATENT DOCUMENTS 6,663,727 B2 * 12/2003 Fujimura et al. ........... 148/336

FOREIGN PATENT DOCUMENTS

JP        7-118792   *  5/1995   ........... C21D/38/32

* cited by examiner

Primary Examiner—Deborah Yee
(74) Attorney, Agent, or Firm—Morgan Lewis & Bockius LLP (57) ABSTRACT

A road wheel composition having high surface hardness and high strength, which is manufactured by a heat treatment of a metal powder containing Fe as a main component, C, Si, Mn, P, S, Al, Ti, N, Cr, and B, and a method for manufacturing a road wheel for an automobile having high surface hardness and high strength by quenching an end of a formed road wheel rim by means of high-frequency heater and cooler using the road wheel composition. Road wheel composition includes Fe as a main component, C of 0.10 to 0.40 wt %, Si of 0.15 to 0.35 wt %, Mn of 0.35 to 2.0 wt %, P of not exceeding 0.03 wt %, S of not exceeding 0.3 wt %, Al of 0.05 to 0.15 wt %, Ti of 0.005 to 0.03 wt %, Nb of 0.025 to 0.045 wt %, Cr of not exceeding 0.35 wt %, and B of not exceeding 0.005 wt %. Road wheel having excellent surface hardness and high strength is manufactured.

9 Claims, 5 Drawing Sheets

ROAD WHEEL COMPOSITION AND METHOD FOR MANUFACTURING ROAD WHEEL USING THE SAME

FIELD OF THE INVENTION

The present invention relates to a road wheel composition, a method for manufacturing and treating a road wheel using the road wheel composition, and a road wheel comprising the composition and advantageously made by the described method. More particularly, the present invention relates to a road wheel composition having high surface hardness and high strength, which is manufactured by a heat treatment of a metal powder containing Fe(iron) as a main component, C(carbon), S(silicon), Mn(manganese), P(phosphor), S(sulfur), Al(aluminum), Ti(titanium), N(niobium), Cr(chromium), and boron(B), and a method for manufacturing a road wheel for an automobile having high surface hardness and high strength by quenching an end of a formed road wheel rim by means of high-frequency heater and cooler using the road wheel composition.

BACKGROUND OF THE INVENTION

In general, road wheels for vehicles such as automobiles are manufactured by forming and welding a steel plate material. The steel plate therefore needs a forming property, a burning property, and a weldability.

A steel plate material of a strength 38–60 kg/mm$^2$ grade has been used as a material of a conventional road wheel. The steel plate material of a strength 38–60 kg/mm$^2$ grade is manufactured into road wheels by a press forming operation. The steel plate material then undergoes low temperature heat treatment to obtain a precipitating hardening effect and soft-nitriding treatment to improve the strength, respectively.

However, there is a need in the automobile industry to reduce weight of components. If a road wheel is made of a material having a low strength, and the vehicle including the road wheel get a shock while traveling such as might occur by passing over a small object or a large pot-hole, the road wheel is easily distorted. Thereafter, airs in tires leaks quickly and often so fast the depletion can be termed a blowout, and reliable operation of the wheel is lost. This is a significant safety concern.

The strength of the material of a conventional road wheel is low so that, in order to manufacture a road wheel having a sufficient strength, the width of the material should be thick. The road wheel accordingly becomes heavy.

Wheels are conventionally manufactured by a process that includes press forming, or press molding, a metal plate. When performing a press forming of a road wheel rim using the conventional road wheel material having a low strength, with the resultant high thickness, a crack is easily generated around a cooling hole and a center hole. This reduces the percentage of manufactured tires that pass inspection and, if the flaw is not noticed, this reduces the life-span of a road wheel due to fatigue fracture propagation during the use of the road wheel.

However, when a conventional high strength material, that is, of a strength higher than 38–60 kg/mm$^2$ grade, is used for the road wheel, the press forming property is not adequate and a spring back occurs. Also, a defect such as cracking or breaking during the press forming is still generated so that it is difficult to manufacture the road wheel.

A road wheel composition, and a method for manufacturing a road wheel using the same, which is capable of improving the strength of a finally completed road wheel while paying attention about the press forming property to form a lightweight and a durable road wheel have been greatly demanded.

SUMMARY OF THE INVENTION

The present invention is contrived to solve the foregoing problems. It is an object of the present invention to provide a road wheel composition having high surface hardness and high strength, which is manufactured by a heat treatment of a metal powder containing Fe as a main component, C, Si, Mn, P, S, Al, Ti, N, Cr, and B. It is an object of the present invention to provide a method for reliable manufacturing and treating of a road wheel having high surface hardness and high strength, including a step of heat treating and quenching an end of a formed road wheel rim by means of high-frequency heater and cooler. It is an object of the present invention to provide a road wheel having high surface hardness and high strength yet lower weight than the road wheels manufactured by conventional materials and processes.

In order to achieve the above objects, the present invention provides a road wheel composition comprising:

Fe as a main component, for example about 97.3 wt % to about 99.3 wt %;

C of from 0.10 to 0.40 wt %, for example about 0.16 wt %;

Si of 0.15 to 0.35 wt %, for example about 0.18 wt %;

Mn of 0.35 to 2.0 wt %, for example about 1.87 wt %;

P of not exceeding 0.03 wt %, for example about 0.008 wt % or less;

S of not exceeding 0.3 wt %, for example about 0.002 wt % or less;

Al of 0.05 to 0.15 wt %, for example about 0.12 wt %;

Ti of 0.005 to 0.03 wt %, for example about 0.009 wt %;

Nb of 0.025 to 0.045 wt %, for example about 0.031 wt %;

Cr of not exceeding 0.35 wt %, for example about 0.17 wt %;

and B of not exceeding 0.005 wt %, for example about 0.003 wt %.

While some unlisted impurities or additives which do not substantially change the properties of the composition might be added by a practitioner skilled in the art, in one embodiment the present invention is a road wheel composition consisting essentially of:

Fe as a main component;

C of from 0.10 to 0.40 wt %, for example about 0.16 wt %;

Si of 0.15 to 0.35 wt %, for example about 0.18 wt %;

Mn of 0.35 to 2.0 wt %, for example about 1.87 wt %;

P of not exceeding 0.03 wt %, for example about 0.008 wt % or less;

S of not exceeding 0.3 wt %, for example about 0.002 wt % or less;

Al of 0.05 to 0.15 wt %, for example about 0.12 wt %;

Ti of 0.005 to 0.03 wt %, for example about 0.009 wt %;

Nb of 0.025 to 0.045 wt %, for example about 0.031 wt %;

Cr of not exceeding 0.35 wt %, for example about 0.17 wt %;

and B of not exceeding 0.005 wt %, for example about 0.003 wt %. In another embodiment the road wheel composition consists of the above formulation, and has about 97.3 wt % to about 99.3 wt % iron.

There is also provided a method for manufacturing a road wheel comprising the steps of:

forming a road wheel composition comprising Fe as a main component, C of 0.10 to 0.40 wt %, Si of 0.15 to 0.35 wt %, Mn of 0.35 to 2.0 wt %, P of not exceeding 0.03 wt %, S of not exceeding 0.3 wt %, Al of 0.05 to 0.15 wt %, Ti of 0.005 to 0.03 wt %, Nb of 0.025 to 0.045 wt %, Cr of not exceeding 0.35 wt %, and B of not exceeding 0.005 wt % by for example press forming to manufacture a road wheel rim; and heat treating and quenching at least portions of the formed road wheel, advantageously in one embodiment heating an end of the manufactured road wheel rim by means of a high-frequency heater to a temperature sufficient to improve strength, and quenching by means of for example spraying cool water.

In one embodiment, a high frequency heater is brought into close proximity, for example touching, the area of the road wheel to be heated. Advantageously the heaters simultaneously heat both the outer and inner surfaces of the road wheel along an end of a road wheel rim. Then, the heat-treated portion of the road wheel is quenched, advantageously after the heating coils are separated from the wheel, for example by advancing the road wheel to a cooler where cooling water is sprayed to the road wheel rim through an injector in an amount sufficient to cool the road wheel rim.

Preferably, fixed heating coils of a high frequency heater are mounted at outer and inner surfaces of the road wheel along an end of a road wheel rim and heated, and then the road wheel rim from which the heating coils are separated is installed at a cooler, and cooling water is sprayed to the road wheel rim through an injector to cool the road wheel rim.

In one embodiment some portions of the road wheel may undergo heating while other sections which had previously undergone heating are being quenched. More preferably, heating and cooling operations of a heat treatment section are performed by rotating the road wheel, while one or more heating coils, for example of a high frequency heater, and one or more injectors of a cooler are in a fixed position, wherein the heating and cooling operations are performed on sequential sections of the wheel by rotating the wheel. Alternatively, heating and cooling operations are performed on sequential sections of the wheel by rotating one or more heating coils, for example of a high frequency heater, and one or more injectors of a cooler, wherein the heating and cooling operations are performed by rotating the wheelheating coil of a high frequency heater and the injector of a cooler when the road wheel is fixed.

BRIEF DESCRIPTION OF THE DRAWINGS

The above objects and other characteristics and advantages of the present invention will become more apparent by describing in detail a preferred embodiment thereof with reference to the attached drawings, in which.

DETAILED DESCRIPTION OF THE INVENTION

Compositions are expressed in weight percent with reference to the total weight of the road wheel composition. The invention relates to the road wheel composition, the method for manufacturing the road wheel, and the road wheel for the automobile comprising the composition. Preferred embodiments of the present invention will be explained with reference to the accompanying drawings.

The road wheel composition according to the present invention comprises Fe as a main component, C, Si, Mn, P, S, Al, Ti, Nb, Cr, and B, of predetermined weight percents.

In one embodiment of the road wheel composition according to the present invention, the road wheel composition includes C, Si, Mn, P, S, Al, Ti, Nb, Cr, and B within the ranges as shown in Table 1.

TABLE 1

| Component | wt % |
| --- | --- |
| C | 0.10–0.40 |
| Si | 0.15–0.35 |
| Mn | 0.35–2.0 |
| P | Not exceeding 0.03 |
| S | Not exceeding 0.03 |
| Al | 0.05–0.15 |
| Ti | 0.005–0.03 |
| Nb | 0.025–0.045 |
| Cr | Not exceeding 0.35 |
| B | Not exceeding 0.005 |
| Fe | Residue, i.e., 97.34–99.3 |

Carbon is added in order to obtain a suitable forming property. The carbon is used in the range from 0.10 to 0.40 wt % against the total weight of the road wheel composition. When the content of carbon is less than 0.10 wt %, the moldability is low so that it is difficult to obtain a desired hardness. When the content of carbon is more than 0.40 wt %, the forming property is undesirably reduced.

Silicon is added as a de-oxidizer. Silicon is used in the range from 0.15 to 0.35 wt % against the total weight of the road wheel composition. When the content of silicon is more than 0.35 wt %, the forming property is undesirably reduced.

Manganese is added as a solid-reinforcing element in order to improve the strength and the toughness. The content of Mn is limited to the range from 0.35 to 2.0 wt % to obtain the desired moldability.

Phosphorus is a common impurity. Phosphorus is limited to the range of not exceeding 0.03 wt %.

Sulfur is a common impurity. Sulfur is limited to the range of not exceeding 0.03 wt % in order to obtain the required toughness and the required forming property.

Aluminum used in the present invention is added as a de-oxidizer. Aluminum is used in the range from 0.05 to 0.15 wt %.

Titanium and niobium used in the present invention are added as precipitation hardening and grain refining elements. Advantageously, Ti and Nb are used together in a composition. Ti is used in the range from 0.005 to 0.03 wt %. When the content of Ti is less than 0.005 wt %, precipitation hardening and grain refining effects cannot be sufficiently obtained. When the content of Ti is more than 0.03 wt %, precipitation hardening and grain refining effects are saturated.

Nb is used in the range from 0.025 to 0.045 wt %. When the content of Nb is less than 0.025 wt %, precipitation hardening and grain refining effects cannot be obtained to a sufficient degree. When the content of Nb is more than 0.045 wt %, the precipitation hardening and grain refining effects are saturated.

Chromium and boron are added as hardening reinforcing elements. Cr is used in the range of not exceeding 0.35 wt %. However, Cr is advantageously present, for example in an amount of about 0.17 wt %. B is used in the range of not exceeding 0.005 wt % against the total weight of the road wheel composition. However, B is advantageously present, for example in an amount of about 0.003 wt %.

Since a material having the above composition and contents has an excellent forming property and weldability, it is easy to manufacture a road wheel therefrom. Further, when a road wheel rim is formed using the above material and the end of the formed road wheel rim undergoes a heat treatment, the heat-treated part of the road wheel hardens sufficiently. Accordingly, when an automobile having such road wheels collides with obstacles, the road wheel is not easily crushed.

It is shown in the example 1 to be described later that the material hardens sufficiently after the material having the above composition and contents is heat-treated. After a conventional material for a road wheel and a material for a road wheel according to the present invention are heat-treated under the same temperature condition, their quench hardnesses are measured and compared with each other. The hardness of the material according to the present invention is greater than that of the conventional material. The material according to present invention hardens sufficiently during a heat treatment and has a hardness greater than that achieved with conventional materials.

The material to form a road wheel is advantageously separately formed to manufacture a road wheel rim and a disc. The road wheel rim and the disc are then welded to each other. A heat treatment is then performed to complete the manufacture the road wheel. A preferred method for manufacturing a road wheel using the material having the above composition and contents according to the present invention is characterized by heat-treating the disc and an end of the welded road wheel rim using a high frequency heater.

Namely, after heat-treating the material having the above composition, the heat-treated parts obtain a strong hardness. See, for example, Example 1 and table 3. The preferred method for manufacturing a road wheel according to the present invention is characterized by high frequency heating an end of a road wheel rim, which in a conventional road wheel is easily crushed. Hereinafter, a method for manufacturing a road wheel according to the present invention will be described with reference to the accompanying drawings.

Figure 1:
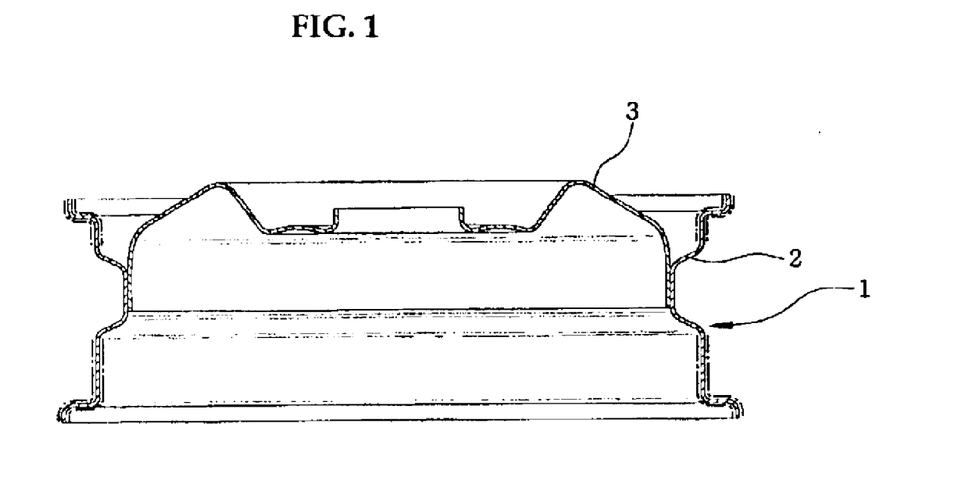
FIG. 1 is a sectional view of a road wheel for an automobile having a heat-treated part according to the preferred embodiment of the present invention.
Figure 2A:
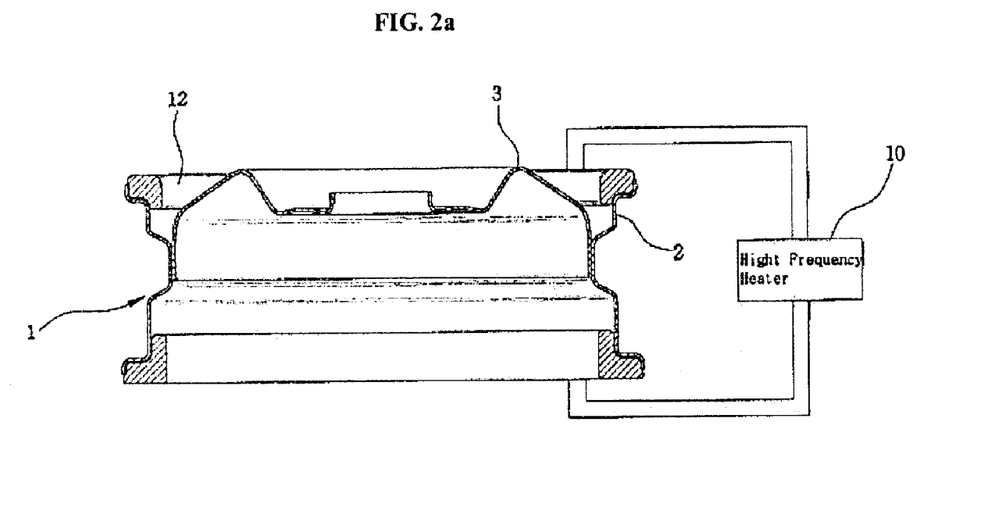
FIG. 2a is a sectional view for showing states of fixed heating coils which are mounted at inner and outer surfaces of the road wheel rim in order to heat the end of the road wheel rim according to the preferred embodiment of the present invention.

FIG. 1 is a sectional view of a conventional road wheel which in preferred embodiments of the present invention comprise material described herein. Reference numeral 2 notes a road wheel rim. Reference numeral 3 notes a disc. In FIG. 1, the heat-treated part according to the present invention, namely, the end of the road wheel rim 2, is indicated at a sectional peripheral area with a dotted line. A high frequency heater is advantageously used to heat the end of the road wheel rim (2), as is shown in FIG. 2a. FIG. 2a is a sectional view for showing the state of fixed heating coils 12 which are mounted at inner and outer surfaces of the road wheel rim 2 in order to heat the end of the road wheel rim 2.

Figure 2B:
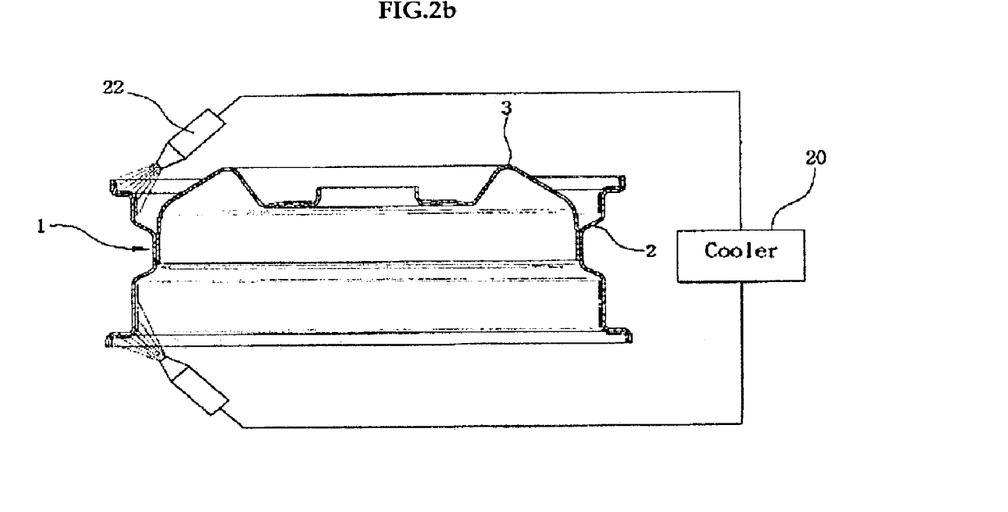
FIG. 2b is sectional view for showing a state when cooling water is sprayed to the road wheel rim through an injector of a cooler in order to cool heated parts according to the preferred embodiment of the present invention.

In a preferred embodiment of a high frequency heat treatment hardening method, fixed heating coils 12 of a high frequency heater 10 are mounted and heated at outer and inner surfaces of a road wheel 1 along the end of a road wheel rim 2. Then, as shown in FIG. 2b, the road wheel rim 2 from which the heating coils 12 are separated is installed at a cooler 20. Cooling water is spayed to the road wheel rim 2 through an injector 22 to cool it. FIG. 2b is a sectional view for showing the state when cooling water is sprayed to the road wheel rim 2 through the injector 22 of the cooler 20 in order to cool the heated parts.

As shown in FIGS. 2a and 2b, outer and inner surfaces simultaneously undergo heat treatments, or alternatively the outer and inner surfaces can undergo heat treatments one by one.

Figure 3A:
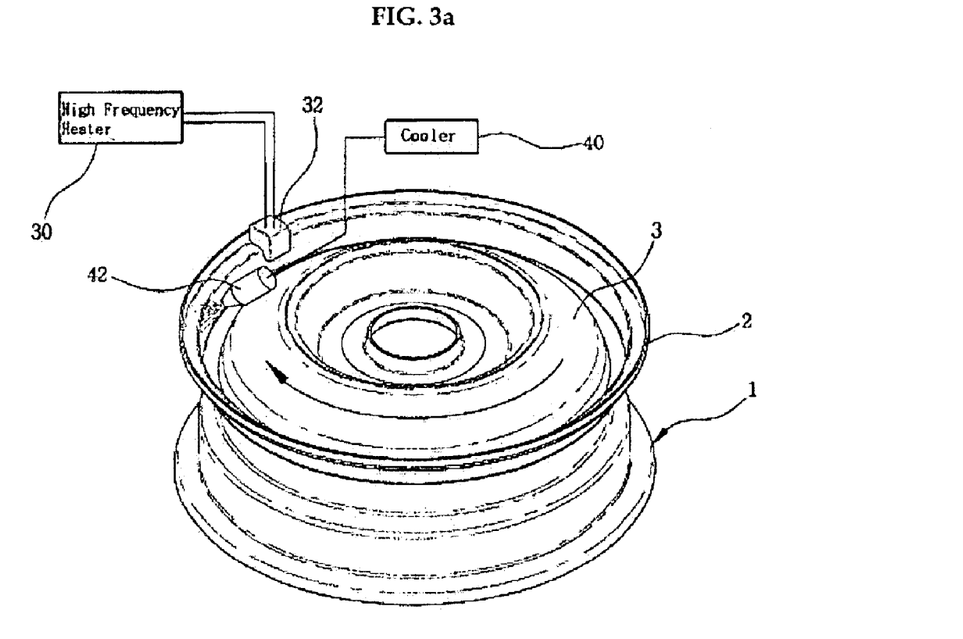
FIG. 3a is a view for showing a state of an outer surface of an end of the road wheel rim which performs a continuous heating and cooling according to the preferred embodiment of the present invention.
Figure 3B:
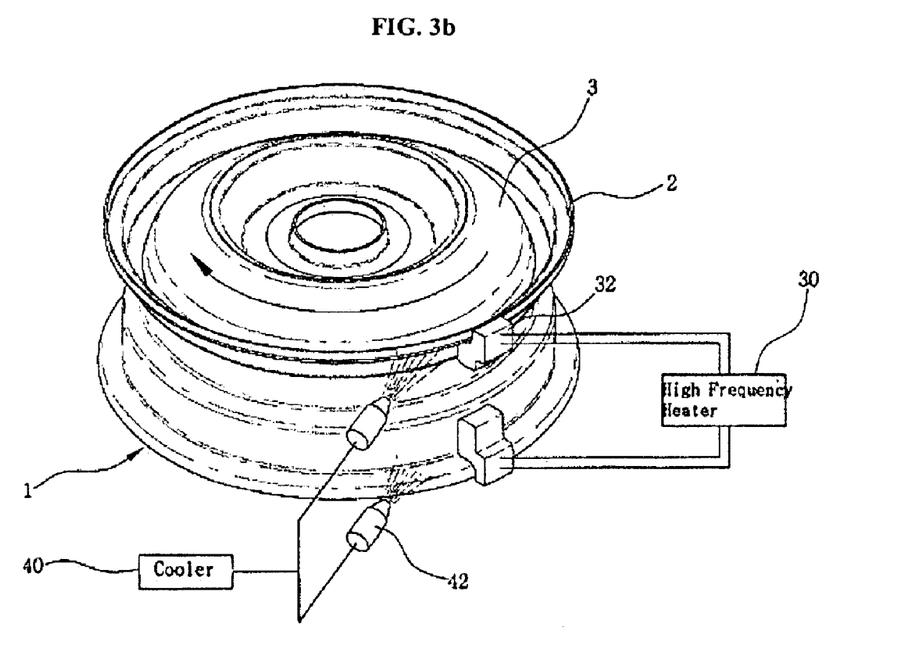
FIG. 3b is a view for showing a state of an inner surface of an end of the road wheel rim which performs a continuous heating and cooling according to the preferred embodiment of the present invention.

FIG. 3a is a view for showing the state of an outer surface of an end of the road wheel rim 2 on which is performed a simultaneous heating and cooling according to a preferred embodiment of the present invention. FIG. 3b is a view for showing the state of an inner surface of an end of the road wheel rim 2 which performs a simultaneous heating and cooling according to a preferred embodiment of the present invention.

Referring to FIGS. 3a and 3b, heating and cooling operations of a heat treatment section may be performed by rotating the road wheel 1 when a heating coil 32 of a heater, for example a high frequency heater 30 and an injector 42 of a cooler 40 are positioned and fixed. The heating and cooling operations of the heat treatment section are also performed by rotating the heating coil 32 of a heater, for example a high frequency heater 30 and the injector 42 of a cooler 40 when the road wheel 1 is fixed.

As described above, in manufacturing a road wheel using a material according to the present invention, when the high frequency heater heat-treats the end of the road wheel rim, the heat-treated part has strong hardness and a road wheel having an excellent impact resistance strength is manufactured.

The present invention will be described in more detail taken in conjunction with the following examples, however, the present invention shall not be limited by the examples.

EXAMPLE 1

A material having a composition as shown in Table 2 was prepared and then cut to a size of 50 mm×50 mm. The cut piece was heated in an electric furnace at a temperature of 930° C. Thereafter, the heated material was cooled in water to manufacture a sample for measuring a quench hardness.

EXAMPLE 2

A material having the same composition and contents as those in the example 1 was cut to a size of 50 mm×50 mm.

A surface of the material was heated by means of a high frequency heater of 30 kHz and 60 kW. Thereafter, the heated material was cooled in water to manufacture a sample for measuring a quench hardness.

EXAMPLE 3

A road wheel for an automobile, including a road wheel rim and a disc both of which have the same composition and contents as those in the examples 1 and 2 was manufactured. A high frequency heater of 30 kHz and 60 kW heated outer and inner surfaces of an end of the road wheel rim, and then cooling water was sprayed to the heated outer and inner surfaces of an end of the road wheel rim to harden the road wheel.

COMPARATIVE EXAMPLE 1

A conventional material is cut by a size of 50 mm×50 mm, and was heated in an electric furnace at a temperature of 930° C. Thereafter, the heated material was cooled in water to manufacture a sample for measuring a quench hardness. The composition and contents of the conventional material are shown in Table 2.

COMPARATIVE EXAMPLE 2

A conventional material having the same composition and size as those in the comparative example 1 was made. A surface of the conventional material was heated by means of a high frequency heater of 30 kHz and 60 kW. Thereafter, the conventional heated material was cooled in water to manufacture a sample for measuring a quench hardness.

COMPARATIVE EXAMPLE 3

A conventional road wheel for an automobile, having disk and rim and using the material having the same composition as those in the comparative examples 1 and 2, was manufactured by a conventional manufacturing method. The conventional road wheel has the same shape and thickness as those in example 3.

TABLE 2

| Element | Ex. 1–3 (wt %) | Com. Ex. 1–3 (wt %) |
| --- | --- | --- |
| C | 0.156 | 0.082 |
| Si | 0.18 | 0.19 |
| Mn | 1.87 | 1.39 |
| P | 0.008 | 0.011 |
| S | 0.002 | 0.01 |
| Cr | 0.17 | — |
| Al | 0.12 | — |
| Ti | 0.009 | — |
| Nb | 0.031 | — |
| B | 0.003 | — |
| Fe | Residue, about 97.45 | Residue, about 98.32 |

The Vickers hardness of the two samples in example 1 and comparative example 1, both of which were heat-treated by the electric furnace, were measured. The Hardness(Hv) of example 1 was 421 kg/sq. mm., and the hardness of comparative example 1 was only 287 kg/sq. mm. A quench hardness of example 1 is stronger than that of the comparative example 1.

TESTING EXAMPLE 2

The Vickers hardness of two samples in example 2 and comparative example 2, both heat-treated by the high frequency heater, were measured. The Hardness (Hv) of example 2 was 432 kg/sq. mm., and the hardness of comparative example 2 was only 291 kg/sq. mm. A quench hardness of example 2 is stronger than that of the comparative example 2.

TESTING EXAMPLE 3

Figure 4:
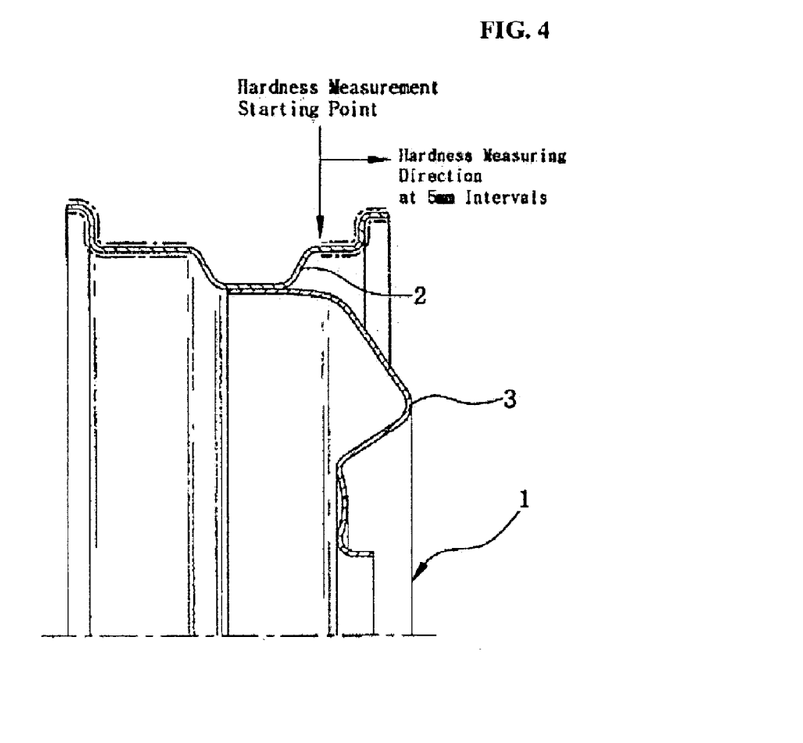
FIG. 4 is a sectional view showing hardness measurement parts of the road wheel according to the preferred embodiment of the present invention.
Figure 5:
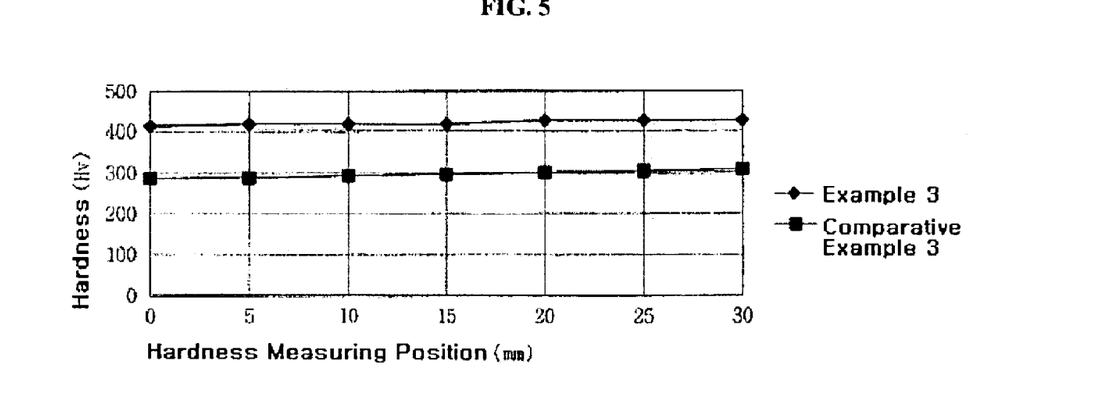
FIG. 5 is a graph showing a hardness measurement result according to the preferred embodiment of the present invention.

FIG. 4 is a sectional view showing the location where hardness measurements of the road wheel of example 3 and comparative example 3 were taken. Hardness of the road wheels of the example 3 and comparative example 3 at the predetermined intervals within the hardened parts of the wheel were measured. Hardness was measured at a total of 7 points on each road wheel 1 from a hardness measurement starting part of FIG. 4 to an outer side at 5 mm intervals. In FIG. 4, a heat treatment reinforcing part is indicated at a sectional peripheral area of the road wheel rim 2 with a dotted line. FIG. 5 is a graph showing the hardness measurement results for example 3 and also for comparative example 3. A quench hardness of the road wheel in the example 3 manufactured according to the present invention is stronger than that of the road wheel in the comparative example 3.

Figure 6:
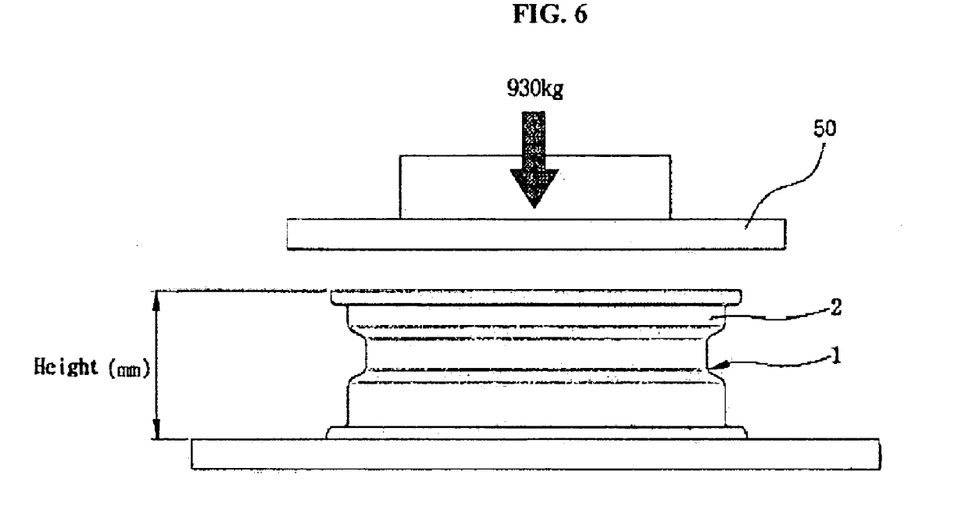
FIG. 6 is a view for illustrating an estimate method of an impact resistance strength according to the preferred embodiment of the present invention.

Impact resistance strengths of the road wheels in example 3 and comparative example 3 were estimated from the following test. FIG. 6 is a view for illustrating the estimate method of an impact resistance strength used for these examples. For the estimate of the impact resistance strengths, as shown in FIG. 6, a bob (50) of 930 kg and having a disc shape free falls from a height of one meter, and after impacting on the road wheel the distortion amount of the road wheel rim 2 was measured. The distortion amount of the road wheel rim 2 is the difference between the height of the road wheel rim before the free fall thereof and the height of the road wheel rim distorted after the free fall thereof. The distortion amount of the road wheel in the example 3, manufactured according to the present invention, was only 0.6 mm, which is much less than the 8 mm distortion of the comparative example 3.

As described previously, in one embodiment a preferred road wheel is manufactured using a material having composition and contents of table 1. Also, at least one and preferably both ends of the formed road wheel rim are advantageously heat treated for example by means of high-frequency heater and quench-hardened to manufacture a road wheel having high surface hardness and high strength. As mentioned above, a road wheel composition and a method for manufacturing a road wheel using the same have the following effects.

1) The road wheel having an excellent surface hardness and high strength is manufactured.
2) The thickness and the weight of the road wheel of comparable strength and impact resistance are reduced due to an excellent surface hardness and high strength of a completed road wheel.
3) Due to the excellent surface hardness and high strength of a completed road wheel, a distortion which occurred offen in an end of the road wheel rim is prevented, thereby preventing accidents due thereto.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A method for manufacturing a road wheel comprising the steps of:

forming a road wheel composition comprising iron as a main component, carbon of from 0.10 to 0.40 wt %, silicon of 0.15 to 0.35 wt %, manganese of 0.35 to 2.0 wt %, phosphorus of not exceeding 0.03 wt %, sulfur of not exceeding 0.3 wt %, aluminum of 0.05 to 0.15 wt %, titanium of 0.005 to 0.03 wt %, niobium of 0.025 to 0.045 wt %, chromium of not exceeding 0.35 wt %, and boron of not exceeding 0.005 wt % to manufacture a road wheel rim; and high-frequency heat treating an end of the manufactured road wheel rim by means of a high-frequency heater and a cooler wherein the high-frequency heater performs a heating operation with a high frequency and the cooler spraying cool water.

2. The method according to claim 1, wherein the step of heat treating comprises fixing heating coils of a high frequency heater to the road wheel and heating at outer and inner surfaces of the road wheel along an end of a road wheel rim, and then the road wheel rim from which the heating coils are separated is installed at a cooler, and cooling water is sprayed to the road wheel rim through an injector to cool the road wheel rim.

3. The method according to claim 1, wherein heating and cooling operations of a heat treatment section are performed by rotating the road wheel when a heating coil of a high frequency heater and an injector of a cooler are positioned and fixed, and the heating and cooling operations of the heat treatment section are performed by rotating the heating coil of a high frequency heater and the injector of a cooler when the road wheel is fixed.

4. A road wheel for an automobile, said road wheel comprising at least one portion having a heat-treatable material comprising:

Fe as the major component;

about 0.16 wt % of C;

about 0.18 wt % of Si;

about 1.87 wt % of Mn;

about 0.17 wt % of Cr;

about 0.12 wt % of Al;

about 0.008 wt % or less of P;

less than 0.3 wt % of S;

Ti of from about 0.005 to about 0.03 wt %;

Nb of from about 0.025 to about 0.045 wt %;

Cr in an amount sufficient to achieve a predetermined hardness but not exceeding about 0.35 wt %; and B in an amount sufficient to achieve a predetermined hardness but not exceeding 0.005 wt %.

5. The road wheel for an automobile of claim 4, wherein said heat-treatable material comprises at least about 97.3 wt % of Fe and at least about 0.003 wt % of B, and wherein at least a portion of the heat-treatable material is heat treated by heating to a temperature sufficient to achieve improved hardening of the heat-treatable material and quenching the heated heat-treatable material.

6. A method for manufacturing a road wheel comprising the steps of:

forming a road wheel comprising at least a portion having a heat-treatable material of claim 4; and heat treating by heating at least a portion of the heat-treatable material to a temperature sufficient to achieve improved hardening of the heat-treatable material and quenching the heated heat-treatable material.

7. The method for manufacturing a road wheel of claim 6 wherein the portion of the road wheel to be heat treated comprises at least one end of the rim, wherein heating of the heat-treatable material comprises placing heating coils of a high frequency heater in close proximity to an end of the rim for a time sufficient to heat the end of the rim.

8. The method for manufacturing a road wheel of claim 6 wherein the portion of the road wheel to be heat treated comprises at least one end of the rim, wherein heating of the heat-treatable material comprises placing heating coils of a high frequency heater in close proximity to an end of the rim for a time sufficient to heat the end of the rim.

9. The method for manufacturing a road wheel of claim 6 wherein the entire road wheel is made of the heat treatable material of claim 4, and wherein the portion of the road wheel to be heat treated comprises both ends of the rim.

* * * * *